Patented July 17, 1923.

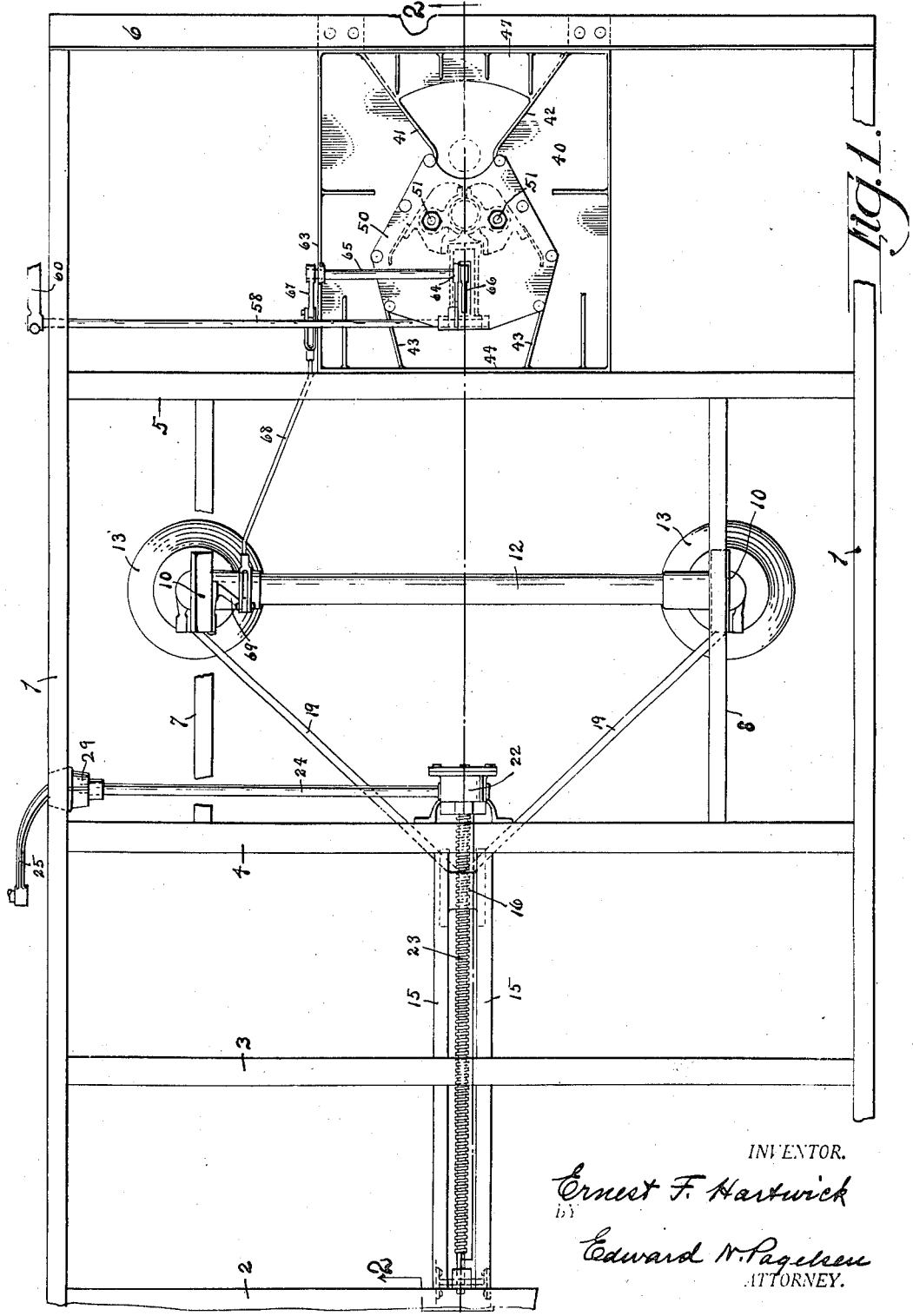

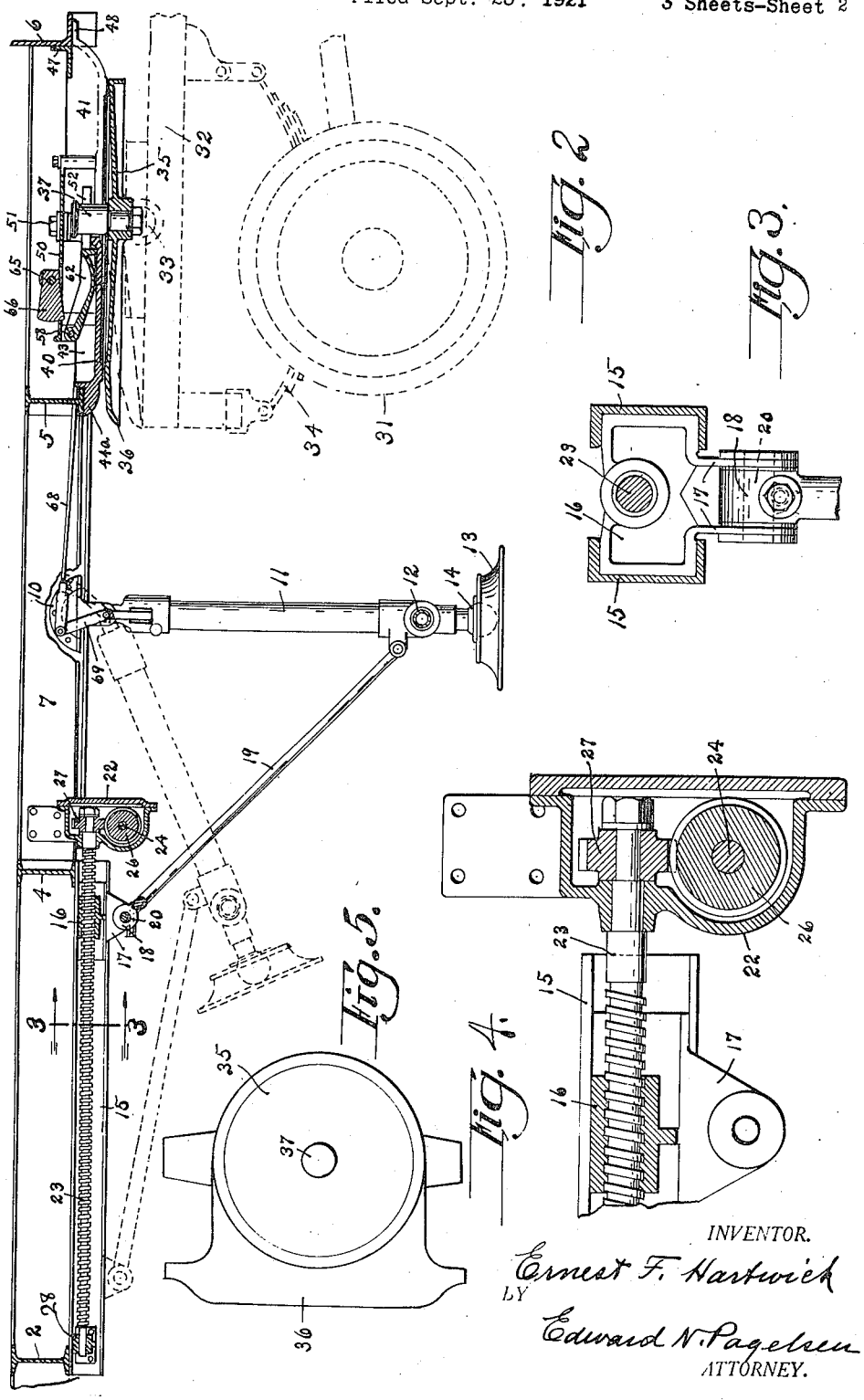

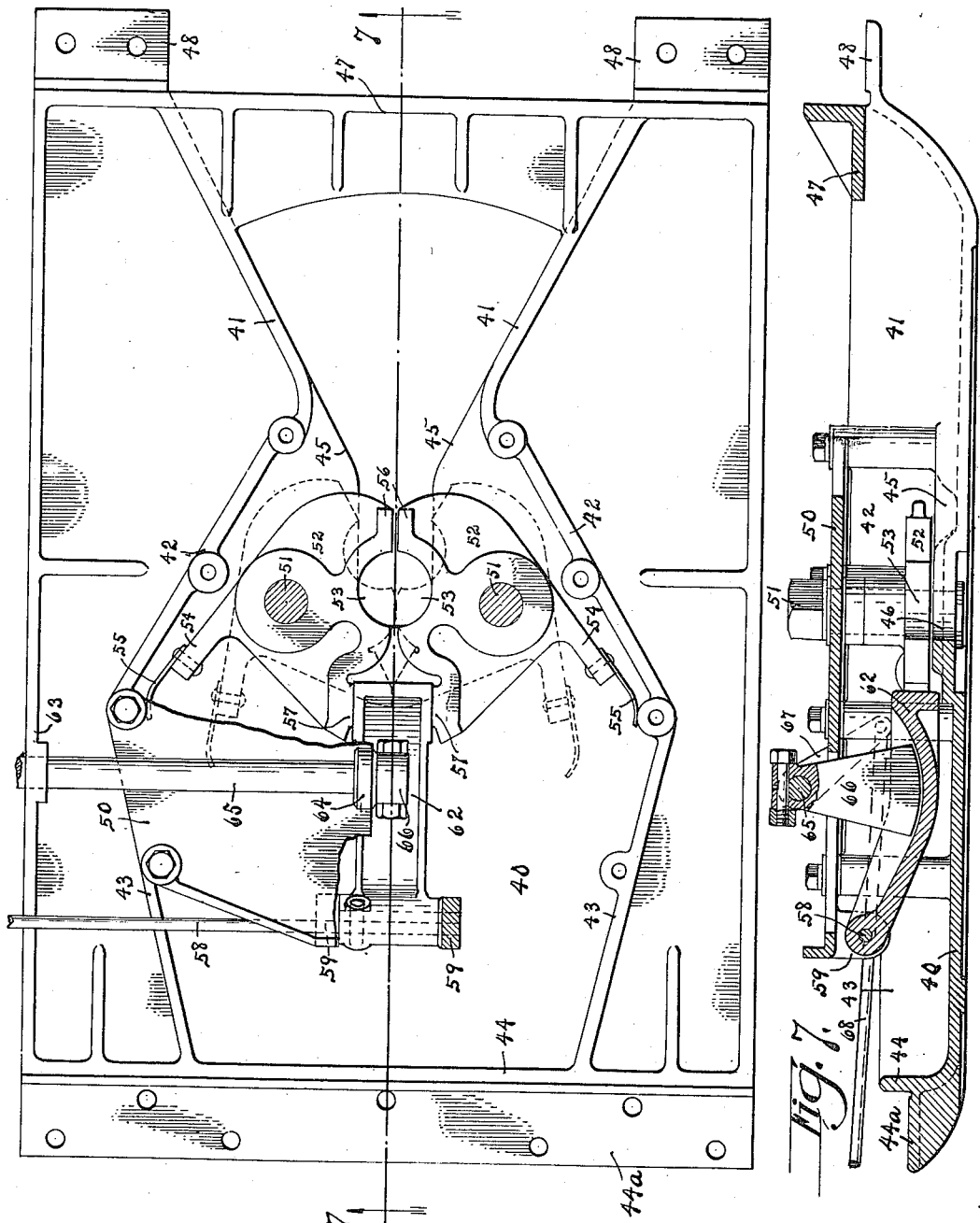

1,461,880

UNITED STATES PATENT OFFICE.

ERNEST F. HARTWICK, OF GREENFIELD TOWNSHIP, WAYNE COUNTY, MICHIGAN, ASSIGNOR TO DETROIT TRAILER COMPANY, OF DETROIT, MICHIGAN, A CORPORATION OF MICHIGAN.

TRAILER CONNECTION.

Application filed September 23, 1921. Serial No. 502,720.

*To all whom it may concern:*

Be it known that I, ERNEST F. HARTWICK, a citizen of the United States, and residing at Greenfield Township, in the county of Wayne and State of Michigan, have invented a new and Improved Trailer Connection, of which the following is a specification.

This invention relates to means for connecting two-wheel trailers to tractor wheels, and its object is to provide a structure of this character which will permit ready and automatic connection between the vehicles, which will prevent disconnection until a proper support is positioned for that end of the trailer which connects to the tractor, which cannot accidentally disconnect, which shall be of great strength, and which will not readily get out of order.

This invention consists, in combination, of a tractor and a trailer adapted to have one end carried by the tractor, of a supporting ring and tractor pin mounted on the tractor, a guide frame mounted on the trailer and adapted to slide across and rotate on said supporting ring, and a pair of pivoted jaws adapted to be opened and closed by the tractor pin, and manually operable means adapted to fit between projections on said jaws to keep them from opening to release the tractor pin.

It further consists in a supporting device for the front end of the trailer and manually operable means to swing the same to and from vertical position, and an interlock operatively connected to said support which prevents the release of the tractor pin from the guide plate on the trailer until said supports are in proper position to support the front end of the trailer.

It also consists in the details of construction illustrated in the accompanying drawings and particularly pointed out in the claims.

In the accompanying drawings, Fig. 1 is a plan of the front end of the frame of a trailer embodying the present invention. Fig. 2 is a section on the line 2—2 of Fig. 1. Fig. 3 is a section on the line 3—3 of Fig. 2. Fig. 4 is a longitudinal section of mechanism for swinging the supporting legs for the trailer. Fig. 5 is a plan of the portion of the fifth wheel which is mounted on the tractor. Fig. 6 is a plan of the guide frame and locking mechanism. Fig. 7 is a section on the line 7—7 of Fig. 6.

Similar reference characters refer to like parts throughout the several views.

Transportation of such articles as lumber, small castings in bulk and brick has been cheapened by the use of a strong, short-turning automotive tractor and a number of two-wheel trailers adapted to connect to the tractor, the trailers being loaded or unloaded or even permitted to remain loaded while the tractor conveys other trailers. These trailers are often of great capacity, but their cost is only a fraction of the cost of an automotive truck of the same capacity. Substantially all of these trailers have been provided with pivoted legs or other supports for their front ends to hold them elevated when disconnected from the tractor, and the connection between the tractor and trailers is usually in the form of a fifth-wheel of which one member is permanently attached to the trailer and the other to the tractor. In many cases a king-pin constitutes a portion of the installation of one vehicle while the other vehicle is provided with means to retain the pin in position.

In the present invention the supporting legs are so pivoted that they may be swung up under the frame of the trailer when the trailer is attached to the tractor, the trailer and tractor are provided with co-operating portions of a fifth-wheel, and the portion thereof on the tractor embodies a king-pin while the portion on the trailer embodies jaws to so engage this king-pin as to provide a positive connection between them. Manually operable means are also provided to prevent the jaws from releasing this pin.

In addition thereto, a keeper is provided to prevent the operation of this releasing mechanism and a connection between the supporting legs and the keeper is provided which holds the keeper in operative position until the legs have been swung down into position to support the trailer, thereby preventing dis-connection of tractor and trailer until means have been provided to support the front end of the trailer.

Referring to Figs. 1 and 2, the side bars 1 of the trailer frame are united by the cross bars 2, 3, 4 and 5, all preferably I-beams and the front cross bar 6 which is preferably an angle bar. Bars 7 and 8 support the brackets 10 on which the support for the trailer which embodies a pair of legs 11, is pivoted, and these legs are shown connected by the brace 12 and provided with feet 13 which are attached to the balls 14 at the lower ends of the legs.

Attached to the lower sides of the cross bars 2, 3 and 4 are the guides 15, preferably channels, in which a nut 16 is slidable. This nut has a pair of lugs 17 between which the eye 18 at the upper ends of the diagonal bars 19 is mounted on a pin 20. Secured to the cross bar 4 is a case 22 in which the front end of the screw 23 and the inner end of the shaft 24 are journaled. The shaft 24 has an operating crank handle 25 at its outer end and a worm 26 on its inner end within the case and this worm meshes with the worm gear 27 on the front end of the screw 23. The screw is threaded in the nut 16 and is journaled in a bearing 28 at its rear end. The shaft 24 is carried at its outer end by a bracket 29. Rotation of this shaft and screw will cause the nut to slide in its guides and the legs to swing from the position shown in solid lines in Fig. 2 to that shown in dotted lines, or back, depending on the direction of rotation of the shaft.

In Fig. 2 I have shown in dotted lines a rear wheel 31, springs 34 and a portion of the frame 32 of a tractor of any desired construction. Mounted on this frame on a horizontal transverse axis 33 is a lower member 35 of a fifth-wheel which has a rearwardly extending apron 36 on which that portion of the trailer portion of the fifth-wheel may slide up. The transverse axis 33 permits this member 35 to swing down to the position indicated in dotted lines in Fig. 2, which permits the trailer portion of the fifth-wheel to slide up much more readily. A king-pin 37 extends up from this member 35.

The trailer portion of the fifth-wheel is shown more clearly in Figs. 6 and 7. It consists generally in a base plate 40 from which the walls 41, 42, 43 and 44 extend upwardly. The wall 44 is adapted to engage the cross bar 5, the flange 44ª extending under the same. The base plate is cut away between the walls 41 and thus these walls constitute guides for the king-pin 37, these guides being continued in the edges 45 of the base to the semi-circular recess 46 indicated in Fig. 7. Extending across between the front ends of these walls 41 is a reinforcing bar 47 which is adapted to engage the front cross bar 6 of the trailer frame. The base plate 40 slopes up at its front end, as shown in Fig. 7, and terminates in flanges 48 adapted to be secured to the lower flange of this angle bar 6. This guide frame is rotatable on the supporting ring 35.

A plate 50 extends across between the opposite walls 42 and 43 as shown in Figs. 1 and 7. Extending vertically between the base plate 40 and the plate 50 are two bolts or pins 51 on which the jaws 52 are mounted. These jaws have semi-circular recesses 53 to receive the king-pin 37, arms 54 to which the springs 55 are attached, stops 56 at their front ends and 57 at their rear ends.

A shaft 58 is mounted in the left side bar 1 of the trailer frame and in bearings 59 on the lower side of the plate 50 and secured to it are the operating handle 60 and the locking dog 62 which is adapted to lie between the stops 57 on the jaws 52. Mounted in a flange 63 at the outer edge of this base 40 and in a bearing 64 on the top of the plate 50 is a second transverse shaft 65 which has a control dog 66 at its inner end and a crank arm 67 at its outer end. A link 68 connects this crank arm to the outer end of the crank arm 69 attached to the left hand supporting leg 11, as indicated in Fig. 2.

The operation of this device is as follows. When the legs have been swung down to vertical or supporting position as shown in Fig. 2, the arm 69 draws back the link 68 and swings the control dog 66 to the position there shown. This releases the locking dog 62 which may now be swung up by the handle 60 and shaft 58 from between the stops 57 on the dogs 52. When this occurs, the springs 55 swing the stops 57 toward each other and under the locking dog 62, which permits the handle 60 to be released. The tractor is then moved forwardly and the king-pin 37 thereon swings apart the jaws 52 to the position shown in dotted lines in Fig. 6. As the tractor moves forward, the base 40 slides on the plate 35 which tips back and thus gently lowers the legs 11 to the ground, where they remain until the tractor again backs up to the front end of the trailer to take on this load.

When this occurs, the apron 36 slips under the upwardly sloping front end of the base 40, the king-pin 37 entering the tapering space between the walls 41, sliding along one of these walls if necessary until it reaches the semi-circular recess 46 in the base 40. While doing this, the plate 35 assumes a horizontal position and thereby elevates the front end of the trailer, lifting the legs 11 from the ground. As the king-pin moves back, it engages in the semi-circular recesses 53 in the jaws 52 and swings them back to the position shown in solid lines in Fig. 6, until the stops 56 engage, at which time the stops 57 have been separated sufficiently to permit the locking dog 62 to fall between them. The handle 25 is now turned to swing the legs 11 up to dotted-line position in Fig. 2, which causes the control dog 66 to swing down to the position shown in Fig. 7 where it prevents the locking dog from rising from between the rear ends of the jaws 52.

This is, therefore, a one-man construction. The tractor operator backs his vehicle until the king-pin strikes the end of the recess in the bottom plate 40 which puts the labor of backing the trailer on the tractor. This action lifts the front end of the trailer off the legs and onto the truck. The operator then swings up the legs and thereby secures the locking dog which permits him to safely haul the trailer to its next location. At this point the operator swings down the legs to vertical position, swings up the locking dog and then drives away the tractor.

The details of construction and proportions of the parts may all be changed by those skilled in the art without departing from the spirit of my invention as set forth in the following claims.

I claim:—

1. In combination, a fifth-wheel adapted to connect a trailer to a tractor and embodying a tractor pin on one member and means on the other member to secure the tractor pin, means to release said tractor pin, a support for the trailer, and means positioned by said support to prevent unlocking of the tractor pin.

2. In combination, a fifth-wheel adapted to connect a trailer to a tractor and embodying upper and lower relatively rotatable members and a tractor-pin on one member adapted to be received in the other, jaws to secure the tractor-pin in position, means to lock the jaws, a support for the trailer, and means positioned by the support to cause the jaws to remain locked.

3. In combination, a tiltable supporting ring mounted on a tractor vehicle and a tractor-pin extending upward therefrom, a trailer frame having foldable supporting legs and a guide frame adapted to slide onto said supporting ring and having a recess to receive the tractor-pin, jaws mounted on the frame and adapted to engage and disengage the tractor-pin, a dog to prevent the jaws from disengaging the tractor-pin, and means connecting to said legs to prevent the dog from moving to inoperative position when the legs are moved to inoperative position.

4. In combination a fifth-wheel adapted to connect a trailer to a tractor and embodying upper and lower relatively rotatable members and a tractor-pin on one member adapted to be received in the other, jaws to secure the tractor-pin in position, means to lock the jaws, a support for the trailer, means positioned by the support to prevent the release of the means to lock the jaws, and resilient means to force said stop arms toward each other when the dog is moved from between them so as to prevent the dog from again entering said space.

5. In combination, a supporting ring adapted to be mounted on a tractor vehicle and a tractor-pin extending upward therefrom, a trailer frame, a guide frame mounted on the lower side of the front end of the trailer frame and comprising a base plate having a notch to receive the tractor-pin, said base plate being adapted to rotate on the supporting ring on the tractor vehicle with the tractor-pin as a center, a pair of pivots on the base plate, jaws mounted on the pivots and having semi-circular recesses to receive the tractor-pin, stop arms, a dog adapted to enter between the stop arms to prevent separation of the jaws to release the tractor-pin, a pivoted support for the front end of the trailer, means to swing the support to inoperative position, and means connected to the support to prevent actuation of the dog.

6. In combination, a fifth-wheel adapted to connect a trailer to a tractor and embodying upper and lower relatively rotatable members and a tractor-pin on one member adapted to be received in a recess in the other member, jaws to secure the tractor-pin in said recess, manually operable means to lock and unlock said jaws, a support for the trailer, and means positioned by the trailer support to prevent unlocking of the paws.

ERNEST F. HARTWICK.